United States Patent
Jang et al.

(10) Patent No.: US 9,848,471 B2
(45) Date of Patent: Dec. 19, 2017

(54) BACKLIGHT UNIT AND DISPLAY APPARATUS INCLUDING THE SAME

(71) Applicant: Samsung Display Co., Ltd., Yongin-Si, Gyeonggi-Do (KR)

(72) Inventors: Jin-won Jang, Asan-si (KR); Seung-wan Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/203,082

(22) Filed: Jul. 6, 2016

(65) Prior Publication Data
US 2017/0150564 A1 May 25, 2017

(30) Foreign Application Priority Data
Nov. 20, 2015 (KR) .......................... 10-2015-0163486

(51) Int. Cl.
*H05B 37/02* (2006.01)
*H05B 33/08* (2006.01)
*G02F 1/1335* (2006.01)

(52) U.S. Cl.
CPC ... *H05B 33/0827* (2013.01); *G02F 1/133603* (2013.01); *H05B 33/0845* (2013.01)

(58) Field of Classification Search
CPC .............. H05B 33/083; H05B 33/0815; H05B 33/0845; H05B 37/02; H05B 33/0827; G02F 1/133603
USPC .................................................. 315/291, 210
See application file for complete search history.

(56) References Cited

U.S. PATENT DOCUMENTS

| 2005/0195589 A1* | 9/2005 | Sung | G09G 3/342 362/613 |
| 2007/0257623 A1* | 11/2007 | Johnson | H05B 33/0818 315/193 |
| 2007/0262724 A1* | 11/2007 | Mednik | H05B 33/0818 315/125 |
| 2009/0195163 A1* | 8/2009 | Nguyen | H05B 33/0815 315/122 |
| 2010/0117562 A1* | 5/2010 | Tico | H05B 33/0815 315/295 |

(Continued)

FOREIGN PATENT DOCUMENTS

| JP | 2009129591 A | 6/2009 |
| JP | 2013026024 B2 | 2/2013 |
| JP | 2014050112 A | 3/2014 |

(Continued)

*Primary Examiner* — Don Le
(74) *Attorney, Agent, or Firm* — Cantor Colburn LLP

(57) ABSTRACT

A backlight unit includes a main light-emitting diode ("LED") array, a sub LED array, an LED driver which individually controls an on-off operation of the main LED array and an on-off operation of the sub LED array and includes a first switch, a second switch, a third switch, a fourth switch, a sub switch control unit, and a main switch control unit, and a direct current ("DC")/DC converter unit which receives an input voltage and provides a DC voltage to the LED driver where the sub switch control unit controls the first and third switches so that one of the first and third switches is turned on and the other is turned off, and the main switch control unit controls the second and fourth switches so that one of the second and fourth switches is turned on and the other is turned off.

18 Claims, 12 Drawing Sheets

(56) References Cited

U.S. PATENT DOCUMENTS

2016/0044754 A1* 2/2016 Xu ..................... H05B 33/0815
    315/186
2016/0381751 A1* 12/2016 Bong ........................ F21K 9/20
    315/193

FOREIGN PATENT DOCUMENTS

| KR | 100659531 | B1 | 12/2006 |
| KR | 100752376 | B1 | 8/2007 |
| KR | 1020120078999 | A | 7/2012 |
| KR | 101476321 | B1 | 12/2014 |
| KR | 101511189 | B1 | 4/2015 |

* cited by examiner

BACKLIGHT UNIT AND DISPLAY APPARATUS INCLUDING THE SAME

This application claims priority to Korean Patent Application No. 10-2015-0163486, filed on Nov. 20, 2015, and all the benefits accruing therefrom under 35 U.S.C. §119, the content of which in its entirety is herein incorporated by reference.

BACKGROUND

1. Field

Exemplary embodiments of the invention herein relate to a backlight unit and a display apparatus including the same, and more particularly, to a backlight unit which individually controls an on-off operation of a main light-emitting diode ("LED") array and an on-off operation of a sub LED array and a display apparatus including the same.

2. Description of the Related Art

A display apparatus includes a self-luminous display, which emits light by itself, such as an organic light-emitting diode ("OLED") display, a field emission display ("FED"), a vacuum fluorescent display ("VFD"), a plasma display panel ("PDP"), or the like. A light-receiving type display apparatus, which is unable to emit light by itself, requires a light source, and includes such types as a liquid crystal display ("LCD"), an electrophoretic display, or the like.

The light-receiving type display apparatus includes a backlight unit for supplying light. The backlight unit includes a light source for generating light. The light source includes a cold cathode fluorescent lamp ("CCFL"), a flat fluorescent lamp ("FFL"), a light-emitting diode ("LED"), etc., for example. Recently, LEDs which consume less power and generate less heat are widely used as light sources.

A backlight unit ("BLU") is classified into an edge type BLU and a direct type BLU according to an arrangement of light sources of the BLU. A light source of the edge type BLU is disposed at a side of the BLU, and a light source of the direct type BLU is disposed under a screen of a display apparatus.

A typical display apparatus has one LED array. However, in a case of an internet of things ("IoT") display apparatus, a BLU including a main LED array and a sub LED array may be provided. The main LED array provides light to a main display region, and the sub LED array provides light to a sub display region.

SUMMARY

According to exemplary embodiments of the invention, a backlight unit includes a light-emitting diode ("LED") driver for individually controlling an on-off operation of a main LED array and an on-off operation of a sub LED array and a display apparatus including the backlight unit.

According to an exemplary embodiment of the invention, a backlight unit includes a main LED array, a sub LED array, an LED driver, and a DC/DC converter unit.

In an exemplary embodiment, the main LED array may include a plurality of LEDs connected in series.

In an exemplary embodiment, the sub LED array may include a plurality of LEDs connected in series and may be connected in series to the main LED array.

In an exemplary embodiment, a number of the LEDs included in the main LED array may be larger than that of the LEDs included in the sub LED array.

In an exemplary embodiment, the DC/DC converter unit may receive an input voltage and may provide a DC voltage to the LED driver.

In an exemplary embodiment, the LED driver may individually control an on-off operation of the main LED array and an on-off operation of the sub LED array.

In an exemplary embodiment, the LED driver may include a first switch, a second switch, a third switch, a fourth switch, a sub switch control unit, and a main switch control unit.

In an exemplary embodiment, the first switch may be connected in series to the sub LED array.

In an exemplary embodiment, the second switch may be connected in series to the main LED array.

In an exemplary embodiment, the third switch may be connected in parallel to the sub LED array and the first switch connected in series to each other.

In an exemplary embodiment, the fourth switch may be connected in parallel to the main LED array and the second switch connected in series to each other.

In an exemplary embodiment, the sub switch control unit may control the first and third switches so that one of the first and third switches is turned on and the other is turned off.

In an exemplary embodiment, the main switch control unit may control the second and fourth switches so that one of the second and fourth switches is turned on and the other is turned off.

In an exemplary embodiment, the sub switch control unit may receive a sub switch signal and a driving signal and may provide the sub switch signal to the first switch to turn on the first switch or provide the driving signal to the third switch to turn on the third switch.

In an exemplary embodiment, the main switch control unit may receive a main switch signal and a driving signal and may provide the main switch signal to the fourth switch to turn on the fourth switch or provide the driving signal to the second switch to turn on the second switch.

In an exemplary embodiment, the sub switch control unit may include a fifth switch and a first resistor, and the main switch control unit may include a sixth switch and a second resistor.

In an exemplary embodiment, the first to sixth switches may be a field effect transistor ("FET") or a bipolar junction transistor ("BJT").

In an exemplary embodiment, the fifth switch may receive the sub switch signal, and the sixth switch may receive the main switch signal.

In an exemplary embodiment, one terminal of the first resistor may receive the driving signal, and the other terminal of the first resistor may be connected to one terminal of the fifth switch and a control terminal of the third switch.

In an exemplary embodiment, one terminal of the second resistor may receive the driving signal, and the other terminal of the second resistor may be connected to one terminal of the sixth switch and a control terminal of the second switch.

In an exemplary embodiment, the LED driver may further include a transistor connected to a cathode terminal of the main LED array and adjusting a luminance of the main LED array.

In an exemplary embodiment, the LED driver may further include a variable resistor connected to one terminal of the fourth switch and adjusting a luminance of the sub LED array.

According to an exemplary embodiment of the invention, a display apparatus includes a display panel for displaying an image and a backlight unit for providing light to the display panel.

In an exemplary embodiment, the backlight unit may include a main LED array, a sub LED array, an LED driver, and a DC/DC converter unit.

In an exemplary embodiment, the main LED array may include a plurality of LEDs connected in series.

In an exemplary embodiment, the sub LED array may include a plurality of LEDs connected in series and may be connected in series to the main LED array.

In an exemplary embodiment, the DC/DC converter unit may receive an input voltage and may provide a DC voltage to the LED driver.

In an exemplary embodiment, the LED driver may individually control an on-off operation of the main LED array and an on-off operation of the sub LED array.

In an exemplary embodiment, the display panel may be divided into a display region for displaying the image and a non-display region adjacent to the display region.

In an exemplary embodiment, the display region may be divided into a sub display region to which light is provided by the sub LED array and a main display region to which light is provided by the main LED array.

In an exemplary embodiment, the sub display region may be disposed at a long side or a short side of the main display region.

In an exemplary embodiment, the sub display region may have an area smaller than that of the main display region.

In an exemplary embodiment, the sub LED array and the main LED array may be arranged under the display panel.

In an exemplary embodiment, the sub LED array and the main LED array may be arranged at a long side or a short side of the backlight unit.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
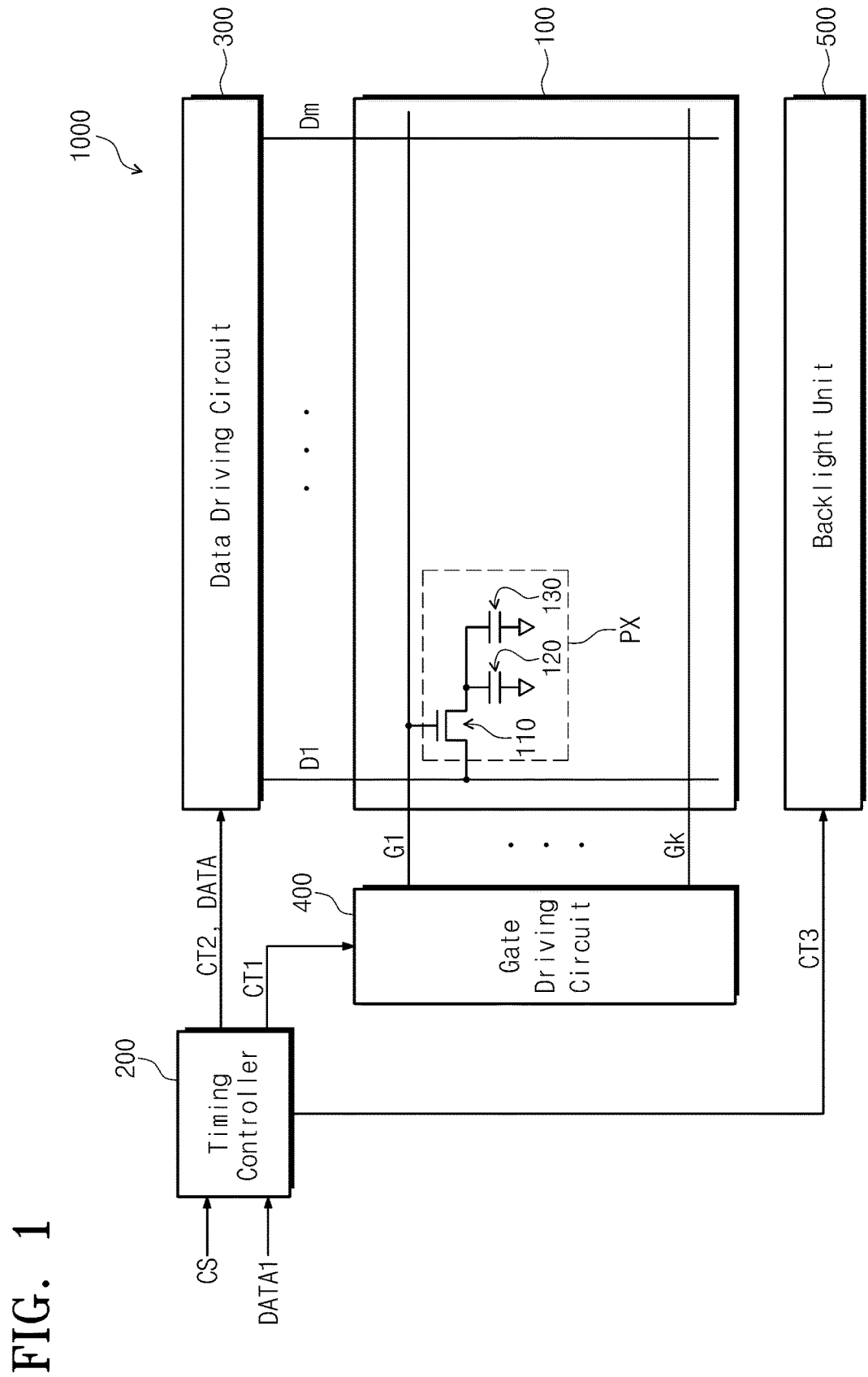
FIG. 1 is a block diagram illustrating an exemplary embodiment of a display apparatus according to the invention.

Exemplary embodiments of the invention will be described below in more detail with reference to the accompanying drawings. The invention may, however, be embodied in different forms and should not be construed as limited to the embodiments set forth herein. Rather, these embodiments are provided so that this disclosure will be thorough and complete, and will fully convey the scope of the invention to those skilled in the art.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram illustrating a display apparatus 1000 according to an exemplary embodiment of the invention.

Referring to FIG. 1, the display apparatus 1000 may include a display panel 100, a timing controller 200, a data driving circuit 300, a gate driving circuit 400, and a backlight unit 500.

The display panel 100 may display an image. The display panel 100 may not be a self-luminous display panel (e.g., an organic light-emitting display panel) but a display panel which displays an image using ambient light. In an exemplary embodiment, the display panel 100 may be any one of a liquid crystal display panel, an electrophoretic display panel, and an electrowetting display panel, for example. The display panel 100 is assumed as a liquid crystal display panel below.

The display panel 100 includes a plurality of gate lines G1 to Gk for receiving a gate signal and a plurality of data lines D1 to Dm for receiving a data voltage, where k and m are natural numbers equal to or greater than two. The gate lines G1 to Gk intersect with and are insulated from the data lines D1 to Dm. A plurality of pixel regions arranged in a matrix form is defined in the display panel 100, where each pixel region is provided with a plurality of pixels. In FIG. 1, an equivalent circuit of one pixel PX is exemplarily illustrated. The pixel PX includes a thin-film transistor ("TFT") 110, a liquid crystal capacitor 120, and a storage capacitor 130.

The TFT 110 includes a control terminal, one end terminal, and the other end terminal. A control terminal of the TFT 110 is connected to the first gate line G1 among the gate lines G1 to Gk. The one end terminal of the TFT 110 is connected to the first data line D1 among the data lines D1 to Dm. The other end terminal of the TFT 110 is connected to the liquid crystal capacitor 120 and the storage capacitor 130. The liquid crystal capacitor 120 and the storage capacitor 130 are connected in parallel to the other end terminal of the TFT 110.

The display panel 100 may include a first display substrate, a second display substrate facing the first display substrate, and a liquid crystal layer disposed between the first and second display substrates.

The gate lines G1 to Gk, the data lines D1 to Dm, the TFT 110, and a pixel electronic (not shown) that is a first electrode of the liquid crystal capacitor 120 are arranged on the first display substrate. The TFT 110 applies the data voltage to the pixel electrode in response to the gate signal.

A common electrode (not shown) that is a second electrode of the liquid crystal capacitor 120 is disposed on the second display substrate, where a reference voltage is applied to the common electrode. However, in another exemplary embodiment of the invention, the common electrode may be provided to the first display substrate.

The liquid crystal layer serves as a dielectric between the pixel electrode and the common electrode. A voltage corresponding to a potential difference between the data voltage and the reference voltage is charged in the liquid crystal capacitor 120.

The timing controller 200 receives image data DATA1 and a control signal CS from the outside of the display apparatus. The control signal may include a vertical synchronization signal for differentiating frames, a horizontal synchronization signal for differentiating rows, a data enable signal which has a high level only during a data output interval to indicate a data-incoming section, and a main clock signal.

The timing controller 200 converts the image data DATA1 so that the image data DATA1 is compatible with a specification of the data driving circuit 300, and outputs converted image data DATA to the data driving circuit 300.

The timing controller 200 generates a gate control signal CT1, a data control signal CT2, and a backlight control signal CT3 on the basis of the control signal CS. The timing controller 200 provides the gate control signal CT1 to the gate driving circuit 400, provides the data control signal CT2 to the data driving circuit 300, and provides the backlight control signal CT3 to the backlight unit 500.

The gate control signal CT1 is used to control operation of the gate driving circuit 400. The gate control signal CT1 may include a scanning start signal for giving instructions to start scanning, at least one clock signal for controlling an output period of a gate-on voltage, and an output enable signal for limiting a duration time of the gate-on voltage.

The data control signal CT2 is used to control operation of the data driving circuit 300. The data control signal CT2 may include a horizontal start signal for indicating a start of transmission of the converted image data DATA to the data driving circuit 300, a load signal for giving instructions to apply the data voltage to the data lines D1 to Dm, and a reversal signal for reversing a polarity of the data voltage with respect to the common voltage.

The backlight control signal CT3 is used to control operation of the backlight unit 500. The backlight control signal CT3 may include an input voltage Vin (refer to FIG. 2), a driving signal Vref (refer to FIG. 2), a sub switch signal A1 (refer to FIG. 2), a main switch signal A2 (refer to FIG. 2), and a luminance adjusting signal PWM Ctrl (refer to FIG. 4).

The data driving circuit 300 generates a gradation voltage according to the converted image data DATA on the basis of the data control signal CT2, and outputs the generated gradation voltage as the data voltage to the data lines D1 to Dm.

The gate driving circuit 400 generates the gate signal on the basis of the gate control signal CT1, and outputs the gate signal to the gate lines G1 to Gk.

The backlight unit 500 is disposed under the display panel 100. The backlight unit 500 provides light to the display panel 100 on the basis of the backlight control signal CT3.

Figure 2:
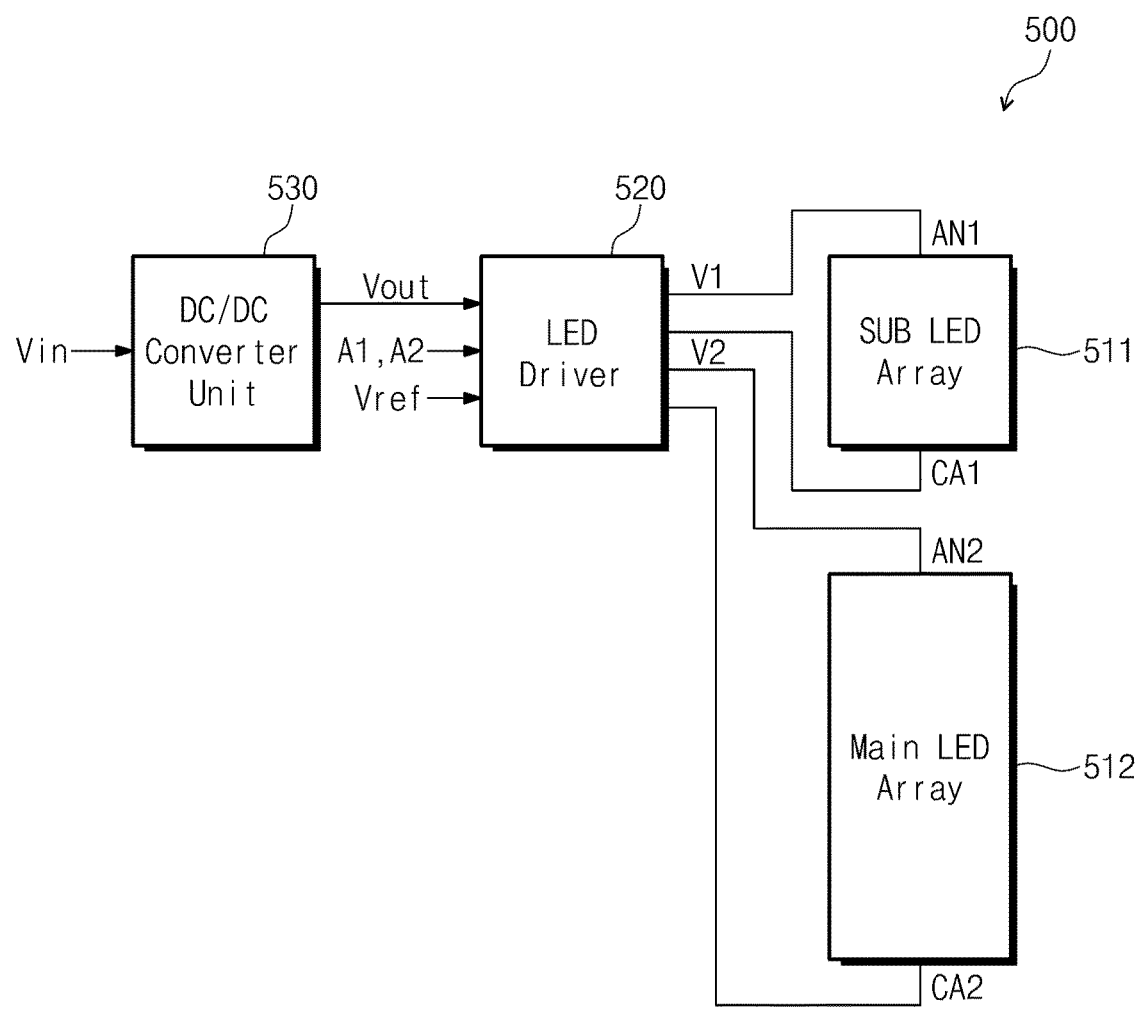
FIG. 2 is a block diagram illustrating the exemplary embodiment of the backlight unit of FIG. 1 according to the invention.

FIG. 2 is a block diagram illustrating the backlight unit 500 of FIG. 1 according to the exemplary embodiment of the invention.

Referring to FIG. 2, the backlight unit 500 includes a sub light-emitting diode ("LED") array 511, a main LED array 512, an LED driver 520, and a direct current ("DC")/DC converter unit 530.

The DC/DC converter unit 530 receives the input voltage Vin to generate a driving voltage Vout, and provides the generated driving voltage Vout to the LED driver 520. Both the driving voltage Vout and the input voltage Vin may be a DC voltage, but may have different levels. In an exemplary embodiment, the driving voltage Vout may have a higher voltage level than that of the input voltage Vin, for example.

The LED driver 520 receives the sub switch signal A1, the main switch signal A2, the driving signal Vref, and the driving voltage Vout. The LED driver 520 may provide a sub driving voltage V1 to an anode terminal AN1 of the sub LED array 511, or may provide a main driving voltage V2 to an anode terminal AN2 of the main LED array 512.

The LED driver 520 individually controls the sub LED array 511 and the main LED array 512. In detail, the LED driver 520 receives the sub switch signal A1 to control the sub LED array 511, and receives the main switch signal A2 to control the main LED array 512. The LED driver 520 may output both the sub driving voltage V1 and the main driving voltage V2, or may output one of the sub driving voltage V1 and the main driving voltage V2. In an alternative exemplary embodiment, the LED driver 520 may output neither the sub driving voltage V1 nor the main driving voltage V2.

The sub LED array 511 may include a plurality of LEDs connected in series to each other. The anode terminal AN1 of the sub LED array 511 is connected to the LED driver 520. When the LED driver 520 provides the sub driving voltage V1 to the anode terminal AN1 of the sub LED array 511, the sub LED array 511 is turned on.

A cathode terminal CA1 of the sub LED array 511 is connected to the LED driver 520, and provides, to the LED driver 520, a voltage dropped by the sub LED array 511. The sub LED array 511 has a luminance determined by a current according to a voltage difference between the anode terminal AN1 and the cathode terminal CA1.

The main LED array 512 may include a plurality of LEDs connected in series to each other. The anode terminal AN2 of the main LED array 512 is connected to the LED driver 520. When the LED driver 520 provides the main driving voltage V2 to the anode terminal AN2 of the main LED array 512, the main LED array 512 is turned on.

A cathode terminal CA2 of the main LED array 512 is connected to the LED driver 520, and provides, to the LED driver 520, a voltage dropped by the main LED array 512. The main LED array 512 has a luminance determined by a current according to a voltage difference between the anode terminal AN2 and the cathode terminal CA2.

In an exemplary embodiment, the number of the LEDs included in the main LED array 512 may be larger than that of the LEDs included in the sub LED array 511.

Although not illustrated, the sub LED array 511 and the main LED array 512 may be disposed (e.g., mounted) on an LED substrate. In an exemplary embodiment, the LED substrate may be a printed circuit board ("PCB"), for example. In an exemplary embodiment, the LED driver 520 may include an integrated circuit ("IC") and may be disposed (e.g., mounted) on the LED substrate, for example.

Figure 3:
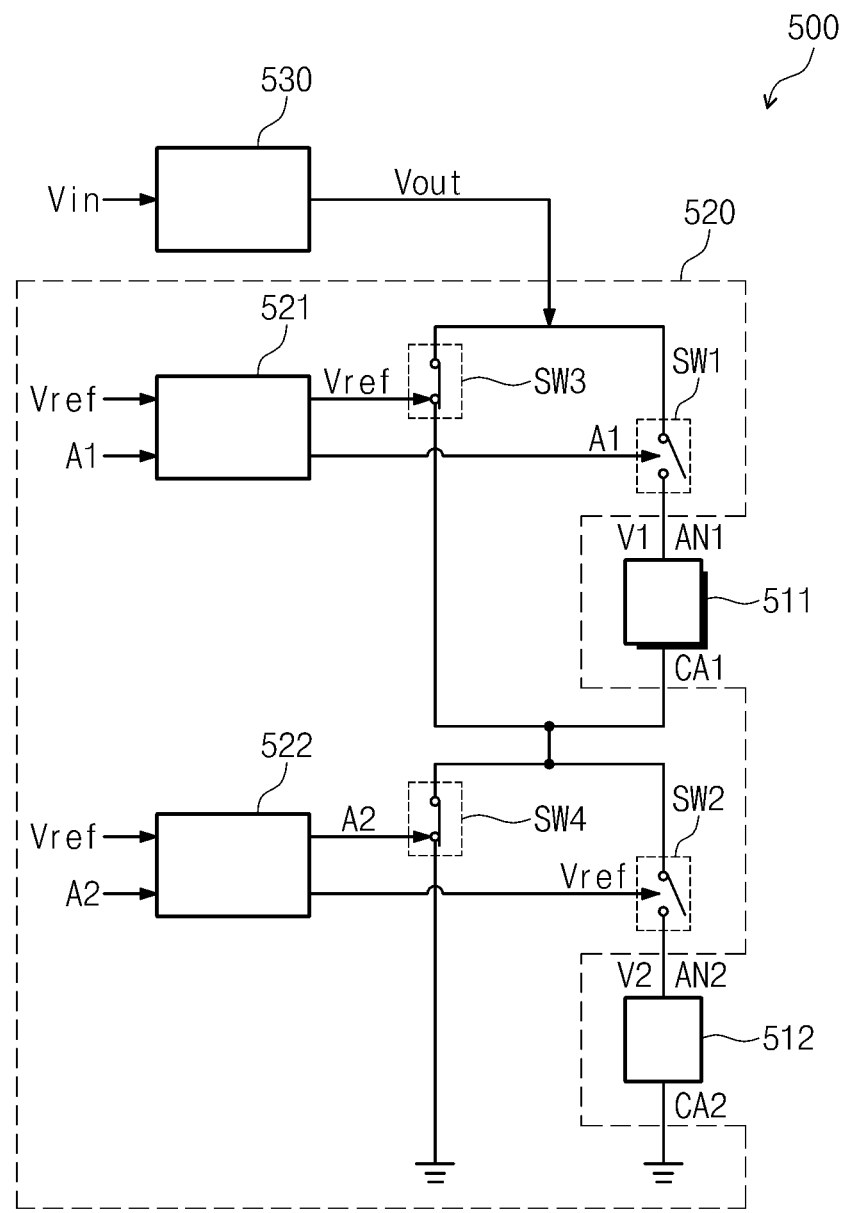
FIG. 3 is a diagram specifically illustrating the exemplary embodiment of the backlight unit of FIG. 2 according to the invention.

FIG. 3 is a diagram specifically illustrating the backlight unit 500 of FIG. 2 according to the exemplary embodiment of the invention.

Referring to FIG. 3, the LED driver 520 includes a first switch SW1, a second switch SW2, a third switch SW3, a fourth switch SW4, a sub switch control unit 521, and a main switch control unit 522.

The first switch SW1 is connected to the anode terminal AN1 of the sub LED array 511. In another exemplary embodiment of the invention, the first switch SW1 may be connected to the cathode terminal CA1 of the sub LED array 511, unlike that illustrated in FIG. 3. When the first switch SW1 is operated in a turned-on state, the sub LED array 511 is turned on. When the first switch SW1 is operated in a turned-off state, the sub LED array 511 is turned off.

The second switch SW2 is connected to the anode terminal AN2 of the main LED array 512. In another exemplary embodiment of the invention, the second switch SW2 may be connected to the cathode terminal CA2 of the main LED array 512, unlike that illustrated in FIG. 3. When the second switch SW2 is operated in a turned-on state, the main LED array 512 is turned on. When the second switch SW2 is operated in a turned-off state, the main LED array 512 is turned off.

The third switch SW3 is connected in parallel to the first switch SW1 and the sub LED array 511 connected in series to each other. When the third switch SW3 is operated in a turned-on state, the sub LED array 511 is turned off. When the third switch SW3 is operated in a turned-off state, the sub LED array 511 is turned on.

The fourth switch SW4 is connected in parallel to the second switch SW2 and the main LED array 512 connected in series to each other. When the fourth switch SW4 is operated in a turned-on state, the main LED array 512 is turned off. When the fourth switch SW4 is operated in a turned-off state, the main LED array 512 is turned on.

One terminal of the first switch SW1 is connected to one terminal of the third switch SW3 so as to receive the driving voltage Vout output from the DC/DC converter unit 530.

The cathode terminal CA1, one terminal of the second switch SW2, the other terminal of the third switch SW3, and one terminal of the fourth switch SW4 are connected to each other.

In an exemplary embodiment, the first to fourth switches SW1 to SW4 may be a field effect transistor ("FET") or a bipolar junction transistor ("BJT"), for example. However, the invention is not limited thereto, and the first to fourth switches SW1 may include various other types of transistors.

The sub switch control unit 521 controls the first and third switches SW1 and SW3 so that one of the first and third switches SW1 and SW3 is turned on and the other is turned off. In detail, the sub switch control unit 521 receives the sub switch signal A1 and the driving signal Vref provided by a user. The sub switch control unit 521 selectively outputs one of the sub switch signal A1 and the driving signal Vref.

When the sub switch control unit 521 provides the sub switch signal A1 to the first switch SW1, the first switch SW1 is operated in a turned-on state and the third switch SW3 is operated in a turned-off state. When the sub switch control unit 521 provides the driving signal Vref to the third switch SW3, the third switch SW3 is operated in a turned-on state and the first switch SW1 is operated in a turned-off state.

Although not illustrated, the sub switch control unit 521 may provide the driving signal Vref to the first switch SW1 or may provide the sub switch signal A1 to the third switch SW3.

The main switch control unit 522 controls the second and fourth switches SW2 and SW4 so that one of the second and fourth switches SW2 and SW4 is turned on and the other is turned off. In detail, the main switch control unit 522 receives the main switch signal A2 and the driving signal Vref provided by the user.

The main switch control unit 522 selectively outputs one of the main switch signal A2 and the driving signal Vref When the main switch control unit 522 provides the main switch signal A2 to the fourth switch SW4, the fourth switch SW4 is operated in a turned-on state and the second switch SW2 is operated in a turned-off state. When the main switch control unit 522 provides the driving signal Vref to the second switch SW2, the second switch SW2 is operated in a turned-on state and the fourth switch SW4 is operated in a turned-off state.

Although not illustrated, the main switch control unit 522 may provide the driving signal Vref to the fourth switch SW4 or may provide the main switch signal A2 to the second switch SW2.

Figure 4:
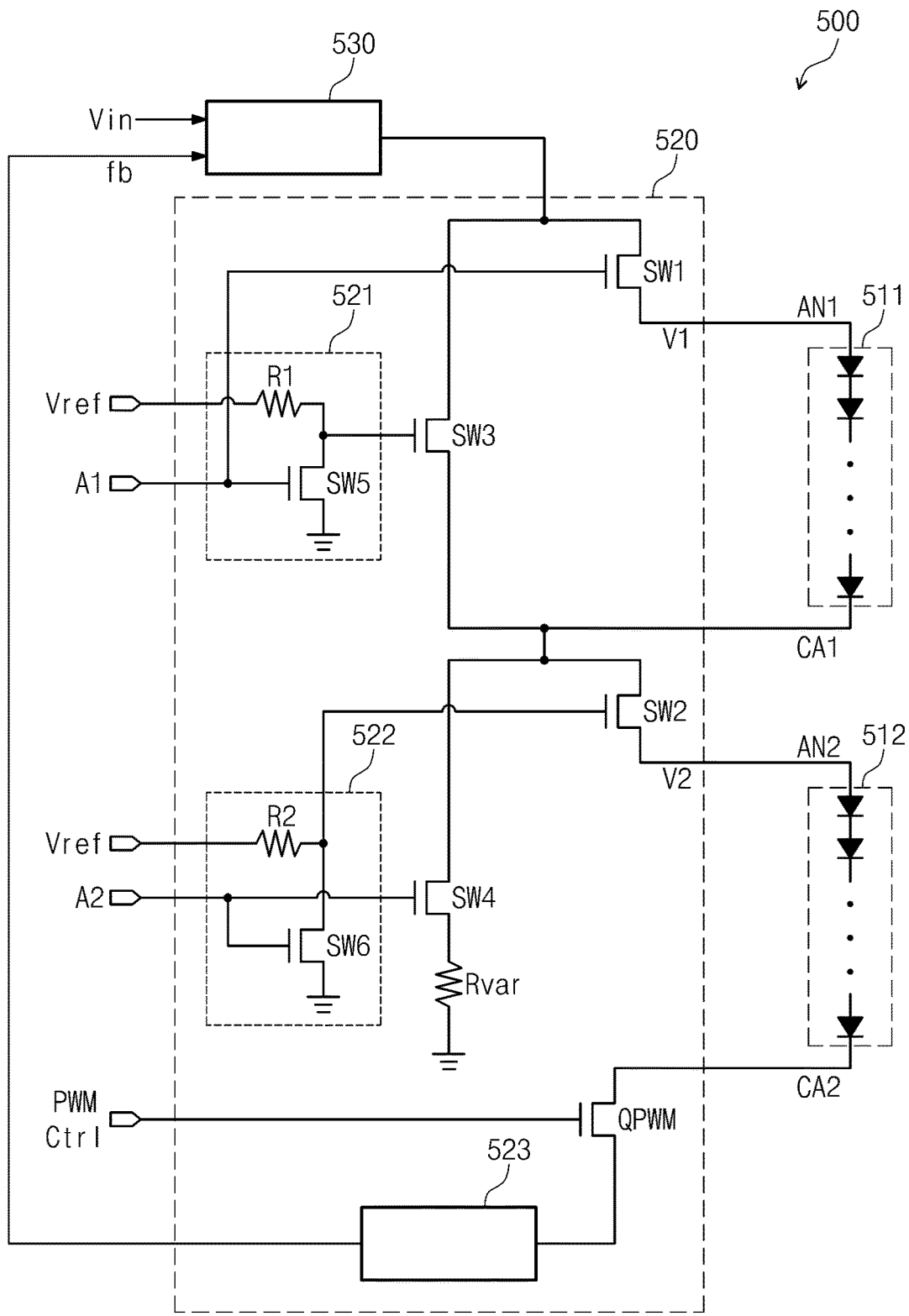
FIG. 4 is a diagram illustrating the exemplary embodiment of a driving circuit of the backlight unit of FIG. 2 according to the invention.

FIG. 4 is a diagram illustrating a driving circuit of the backlight unit 500 of FIG. 2 according to the exemplary embodiment of the invention.

Referring to FIG. 4, the LED driver 520 further includes a main luminance adjusting transistor QPWM, a sub luminance adjusting variable resistor Rvar, and a feedback unit 523. The sub switch control unit 521 may include a fifth switch SW5 and a first resistor R1, and the main switch control unit 522 may include a sixth switch SW6 and a second resistor R2.

In an exemplary embodiment, each of the first to sixth switches SW1 to SW6 and the main luminance adjusting transistor QPWM may be a FET or a BJT, for example. However, the invention is not limited thereto, and the first to sixth switches SW1 to SW6 may include various other types of transistors.

Since the first to fourth switches SW1 to SW4 have the same configurations as described above with reference to FIG. 3, detailed descriptions of the first to fourth switches SW1 to SW4 are not provided below.

One terminal of the first resistor R1 receives the driving signal Vref, and the other terminal of the first resistor R1 is connected to one terminal of the fifth switch SW5 and a control terminal of the third switch SW3. A control terminal of the fifth switch SW5 is connected to a control terminal of the first switch SW1 and receives the sub switch signal A1. The other terminal of the fifth switch SW5 is grounded. A specific driving process of the sub switch control unit 521 will be described later.

One terminal of the second resistor R2 receives the driving signal Vref, and the other terminal of the second resistor R2 is connected to one terminal of the sixth switch SW6 and a control terminal of the second switch SW2. A control terminal of the sixth switch SW6 is connected to a control terminal of the fourth switch SW4 and receives the main switch signal A2. The other terminal of the sixth switch SW6 is grounded. A specific driving process of the main switch control unit 522 will be described later.

One terminal of the main luminance adjusting transistor QPWM is connected to the cathode terminal CA2 of the main LED array 512. Another terminal of the main luminance adjusting transistor QPWM is connected to one terminal of the feedback unit 523. A control terminal of the main luminance adjusting transistor QPWM receives the luminance adjusting signal PWM Ctrl. A resistance value of the luminance adjusting transistor QPWM may be changed according to the luminance adjusting signal PWM Ctrl. Therefore, a current that flows between the one terminal and the other terminal of the main luminance adjusting transistor QPWM may be regulated by the luminance adjusting signal PWM Ctrl received by the control terminal of the main luminance adjusting transistor QPWM.

One terminal of the sub luminance adjusting variable resistor Rvar is connected to the other terminal of the fourth switch SW4, and the other terminal of the sub luminance adjusting variable resistor Rvar is grounded. A resistance value of the sub luminance adjusting variable resistor Rvar may be changed by the user. Therefore, a current that flows between the one terminal and the other terminal of the variable resistor Rvar may be regulated by the resistance value of the variable resistor Rvar set by the user.

The feedback unit 523 senses an output voltage to control an output current. One terminal of the feedback unit 523 is connected to the other terminal of the main luminance adjusting transistor QPWM, and the other terminal of the feedback unit 523 provides a feedback signal fb to the DC/DC converter unit 530.

FIGS. 5 to 8 are diagrams illustrating a driving process of the circuit of FIG. 4.

In an exemplary embodiment, the first to sixth switches SW1 to SW6 may be a FET or a BJT, for example. For consistent description, it is assumed that the first to sixth switches SW1 to SW6 are N-type metal oxide semiconductor field effect transistors ("MOSFETs"). However, the invention is not limited thereto, and the first to sixth switches SW1 to SW6 may include various other types of transistors.

Figure 5:
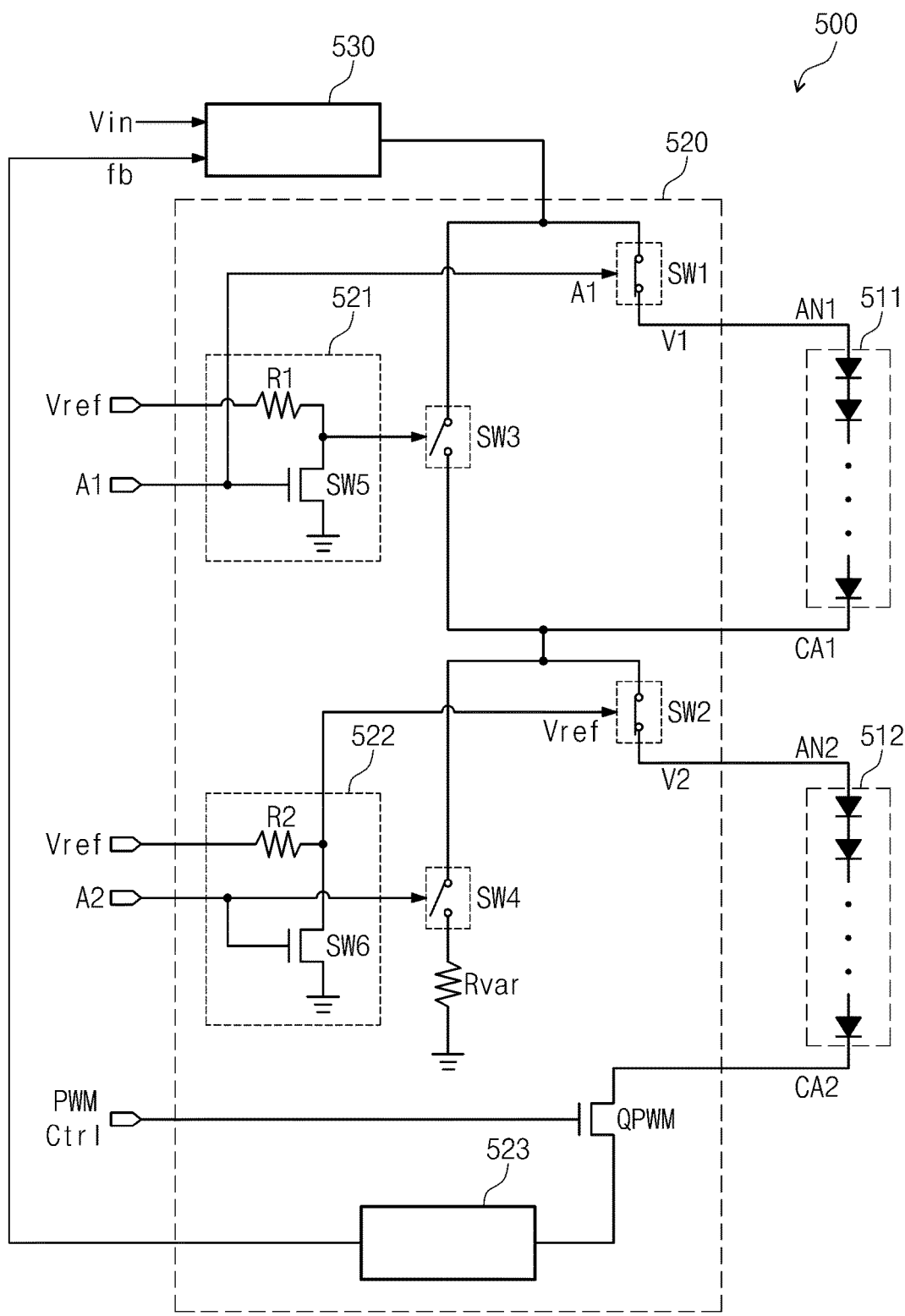
FIGS. 5 to 8 are diagrams illustrating a driving process of the circuit of FIG. 4.

FIG. 5 illustrates a current flow in the case where the sub switch signal A1 is provided at a high level and the main switch signal A2 is provided at a low level.

Since the control terminals of the first and fifth switches SW1 and SW5 receive the high-level sub switch signal A1, the first and fifth switches SW1 and SW5 are operated in a turned-on state. Since the other terminal of the fifth switch SW5 is grounded and the fifth switch SW5 is operated in a turned-on state, the other terminal of the first resistor R1 and the control terminal of the third switch SW3 connected to the one terminal of the fifth switch SW5 are grounded. The control terminal of the third switch SW3 does not receive the driving signal Vref and the third switch SW3 is operated in a turned-off state.

Since the control terminals of the fourth and sixth switches SW4 and SW6 receive the low-level main switch signal A2, the fourth and sixth switches SW4 and SW6 are operated in a turned-off state. Since the sixth switch SW6 is operated in a turned-off state, the other terminal of the second resistor R2 and the control terminal of the second switch SW2 connected to the one terminal of the sixth switch SW6 are not grounded. The control terminal of the second switch SW2 receives the driving signal Vref and the second switch SW2 is operated in a turned-on state.

Since the first switch SW1 is operated in a turned-on state and the third switch SW3 is operated in a turned-off state, the sub driving voltage V1 is provided to the anode terminal AN1 of the sub LED array 511. The current flows between the anode terminal AN1 and the cathode terminal CA1 of the sub LED array 511, and the sub LED array 511 is turned on.

Since the second switch SW2 is operated in a turned-on state and the fourth switch SW4 is operated in a turned-off state, the main driving voltage V2 is provided to the anode terminal AN2 of the main LED array 512. The current that has passed through the cathode terminal CA1 of the sub LED array 511 passes through the anode terminal AN2 of the main LED array 512. The current flows between the anode terminal AN2 and the cathode terminal CA2 of the main LED array 512, and the main LED array 512 is turned on.

The main luminance adjusting transistor QPWM may receive the luminance adjusting signal PWM Ctrl to control the luminance of the sub LED array 511 and the main LED array 512.

Figure 6:
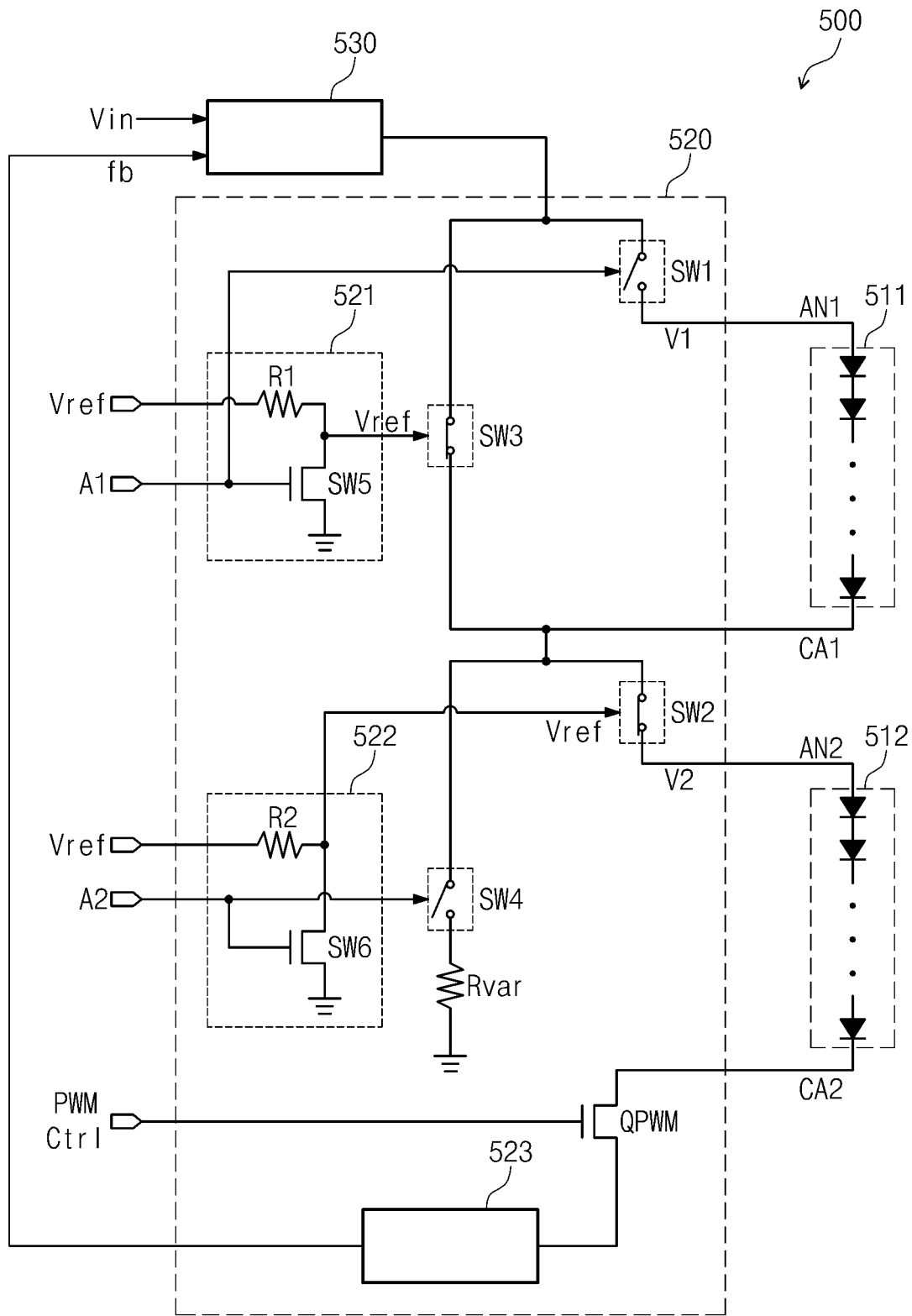

FIG. 6 illustrates a current flow in the case where the sub switch signal A1 is provided at a low level and the main switch signal A2 is provided at a low level.

Since the control terminals of the first and fifth switches SW1 and SW5 receive the low-level sub switch signal A1, the first and fifth switches SW1 and SW5 are operated in a turned-off state. Since the fifth switch SW5 is operated in a turned-off state, the other terminal of the first resistor R1 and the control terminal of the third switch SW3 connected to the one terminal of the fifth switch SW5 are not grounded. The control terminal of the third switch SW3 receives the driving signal Vref and the third switch SW3 is operated in a turned-on state.

Since the control terminals of the fourth and sixth switches SW4 and SW6 receive the low-level main switch signal A2, the fourth and sixth switches SW4 and SW6 are operated in a turned-off state. Since the sixth switch SW6 is operated in a turned-off state, the other terminal of the second resistor R2 and the control terminal of the second switch SW2 connected to the one terminal of the sixth switch SW6 are not grounded. The control terminal of the second switch SW2 receives the driving signal Vref and the second switch SW2 is operated in a turned-on state.

Since the first switch SW1 is operated in a turned-off state and the third switch SW3 is operated in a turned-on state, the sub driving voltage V1 is not provided to the anode terminal AN1 of the sub LED array 511 and The current flows between the one terminal and the other terminal of the third switch SW3. The sub LED array 511 is turned off Since the second switch SW2 is operated in a turned-on state and the fourth switch SW4 is operated in a turned-off state, the main driving voltage V2 is provided to the anode terminal AN2 of the main LED array 512. The current that has passed through the other terminal of the third switch SW3 passes through the anode terminal AN2 of the main LED array 512. The current flows between the anode terminal AN2 and the cathode terminal CA2 of the main LED array 512, and the main LED array 512 is turned on.

The main luminance adjusting transistor QPWM may receive the luminance adjusting signal PWM Ctrl to control the luminance of the main LED array 512.

Figure 7:
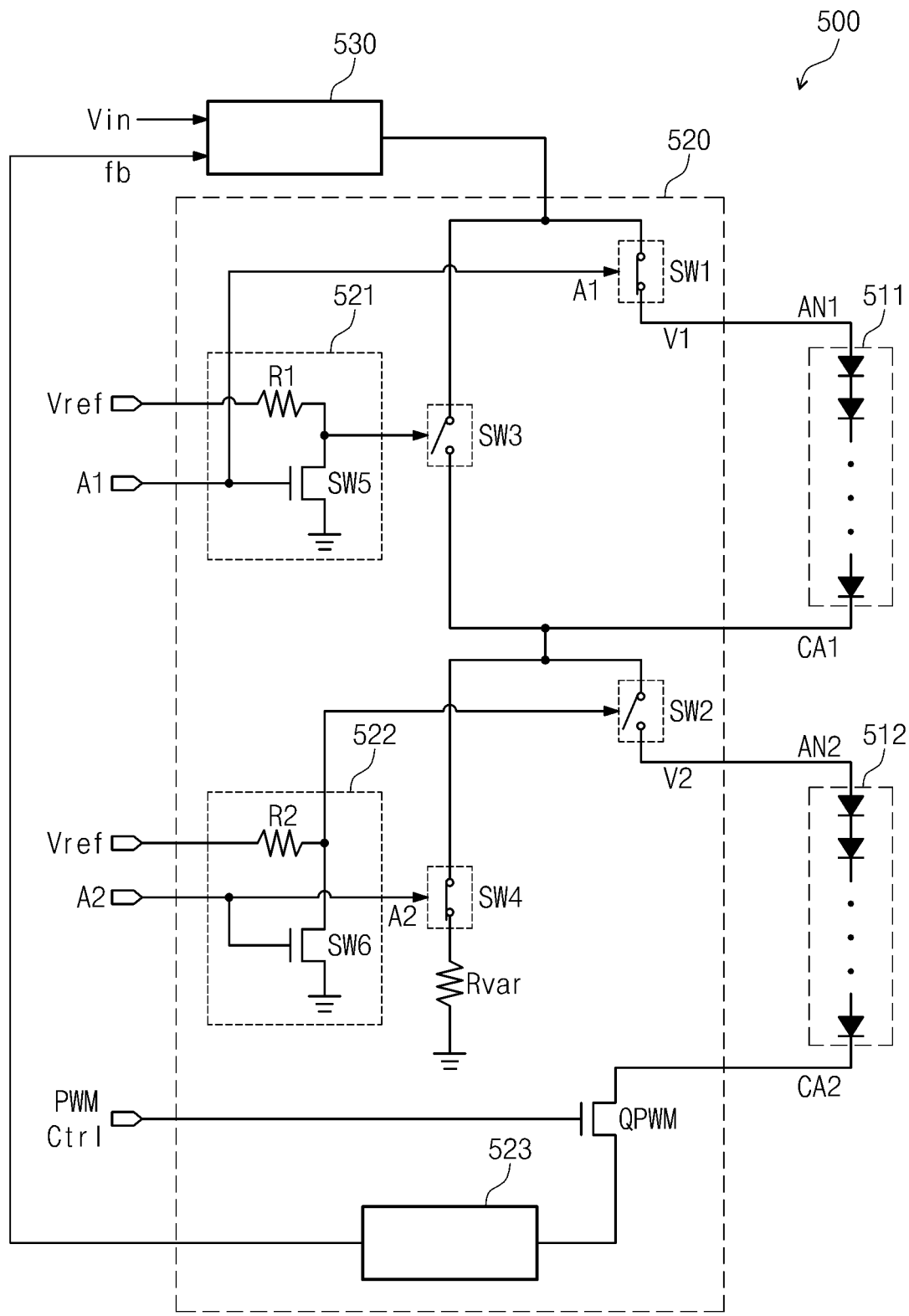

FIG. 7 illustrates a current flow in the case where the sub switch signal A1 is provided at a high level and the main switch signal A2 is provided at a high level.

Since the control terminals of the first and fifth switches SW1 and SW5 receive the high-level sub switch signal A1, the first and fifth switches SW1 and SW5 are operated in a turned-on state. Since the other terminal of the fifth switch SW5 is grounded and the fifth switch SW5 is operated in a turned-on state, the other terminal of the first resistor R1 and the control terminal of the third switch SW3 connected to the one terminal of the fifth switch SW5 are grounded. The control terminal of the third switch SW3 does not receive the driving signal Vref and the third switch SW3 is operated in a turned-off state.

Since the control terminals of the fourth and sixth switches SW4 and SW6 receive the high-level main switch signal A2, the fourth and sixth switches SW4 and SW6 are operated in a turned-on state. Since the other terminal of the sixth switch SW6 is grounded and the sixth switch SW6 is operated in a turned-on state, the other terminal of the second resistor R2 and the control terminal of the second switch SW2 connected to the one terminal of the sixth switch SW6 are grounded. The control terminal of the second switch SW2 does not receive the driving signal Vref and the second switch SW2 is operated in a turned-off state.

Since the first switch SW1 is operated in a turned-on state and the third switch SW3 is operated in a turned-off state, the sub driving voltage V1 is provided to the anode terminal AN1 of the sub LED array 511. The current flows between the anode terminal AN1 and the cathode terminal CA1 of the sub LED array 511, and the sub LED array 511 is turned on.

Since the second switch SW2 is operated in a turned-off state and the fourth switch SW4 is operated in a turned-on state, the main driving voltage V2 is not provided to the anode terminal AN2 of the main LED array 512. The current that has passed through the cathode terminal CA1 of the sub LED array 511 passes through the fourth switch SW4. The current flows between the one terminal and the other terminal of the fourth switch SW4, and the main LED array 512 is turned off The resistance value of the sub luminance adjusting variable resistor Rvar may be adjusted to control the luminance of the sub LED array 511.

Figure 8:
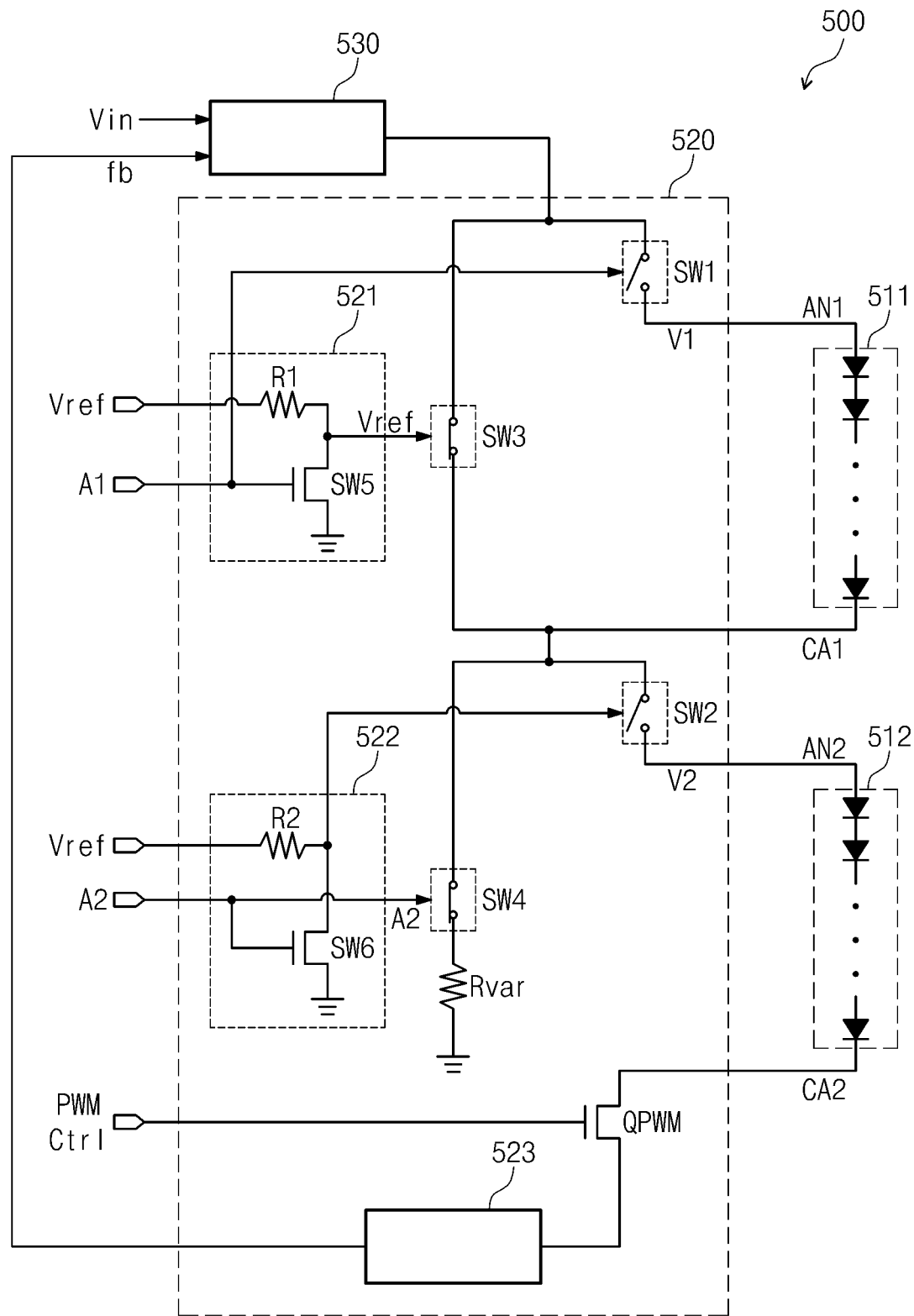

FIG. 8 illustrates a current flow in the case where the sub switch signal A1 is provided in a low level and the main switch signal A2 is provided in a high level.

Since the control terminals of the first and fifth switches SW1 and SW5 receive the low-level sub switch signal A1, the first and fifth switches SW1 and SW5 are operated in a turned-off state. Since the fifth switch SW5 is operated in a turned-off state, the other terminal of the first resistor R1 and the control terminal of the third switch SW3 connected to the one terminal of the fifth switch SW5 are not grounded. The control terminal of the third switch SW3 receives the driving signal Vref and the third switch SW3 is operated in a turned-on state.

Since the control terminals of the fourth and sixth switches SW4 and SW6 receive the high-level main switch signal A2, the fourth and sixth switches SW4 and SW6 are operated in a turned-on state. Since the other terminal of the sixth switch SW6 is grounded and the sixth switch SW6 is operated in a turned-on state, the other terminal of the second resistor R2 and the control terminal of the second switch SW2 connected to the one terminal of the sixth switch SW6 are grounded. The control terminal of the second switch SW2 does not receive the driving signal Vref and the second switch SW2 is operated in a turned-off state.

Since the first switch SW1 is operated in a turned-off state and the third switch SW3 is operated in a turned-on state, the sub driving voltage V1 is not provided to the anode terminal AN1 of the sub LED array 511 and the current flows between the one terminal and the other terminal of the third switch SW3. The sub LED array 511 is turned off Since the second switch SW2 is operated in a turned-off state and the fourth switch SW4 is operated in a turned-on state, the main driving voltage V2 is not provided to the anode terminal AN2 of the main LED array 512. The current that has passed through the other terminal of the third switch SW3 passes through the fourth switch SW4. The current flows between the one terminal and the other terminal of the fourth switch SW4, and the main LED array 512 is turned off FIG. 9 is a block diagram illustrating a backlight unit 600 according to another exemplary embodiment of the invention, and FIG. 10 is a diagram illustrating a driving circuit of the backlight unit 600 of FIG. 9.

Figure 9:
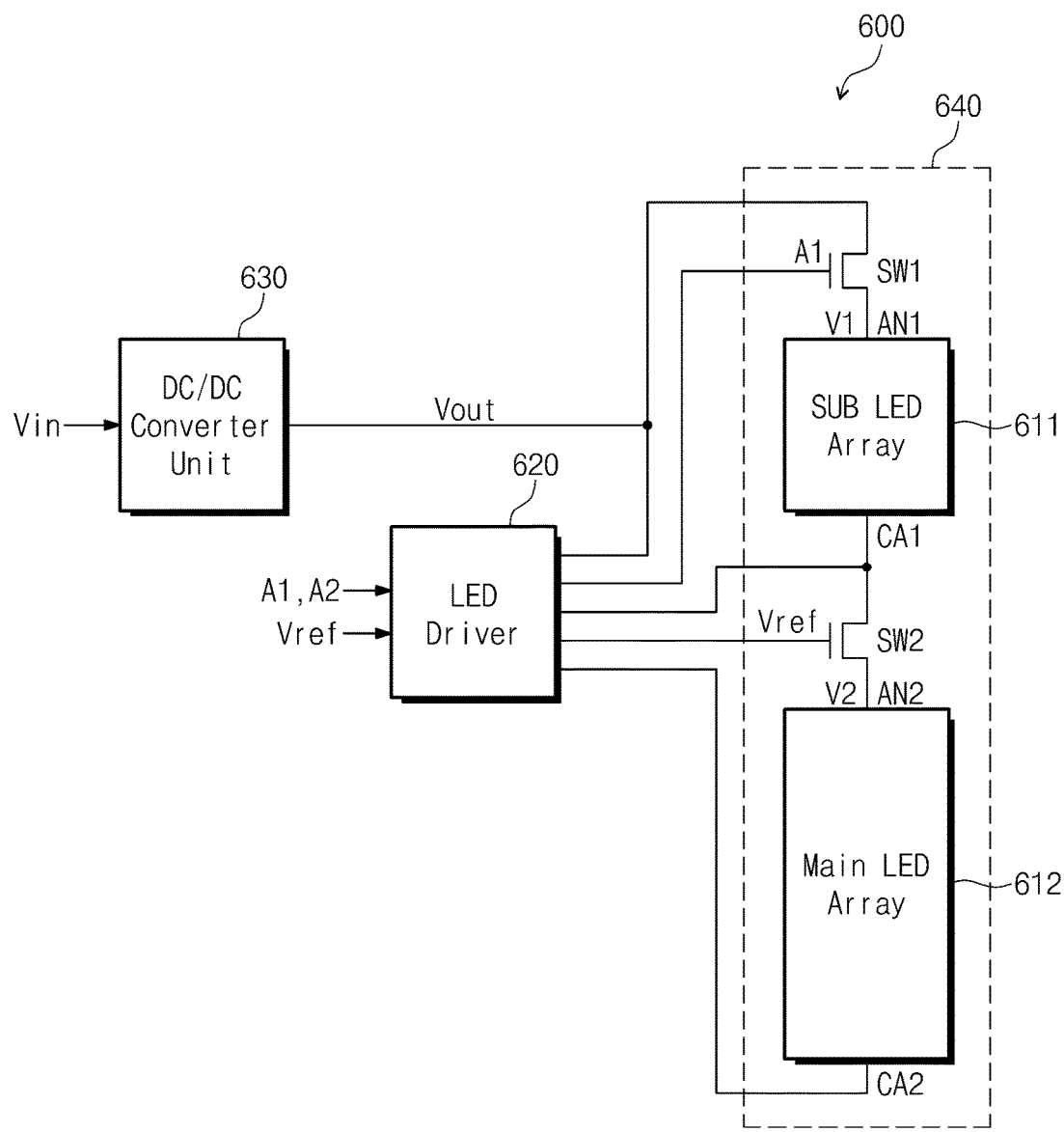
FIG. 9 is a block diagram illustrating another exemplary embodiment of the backlight unit of FIG. 1 according to the invention.
Figure 10:
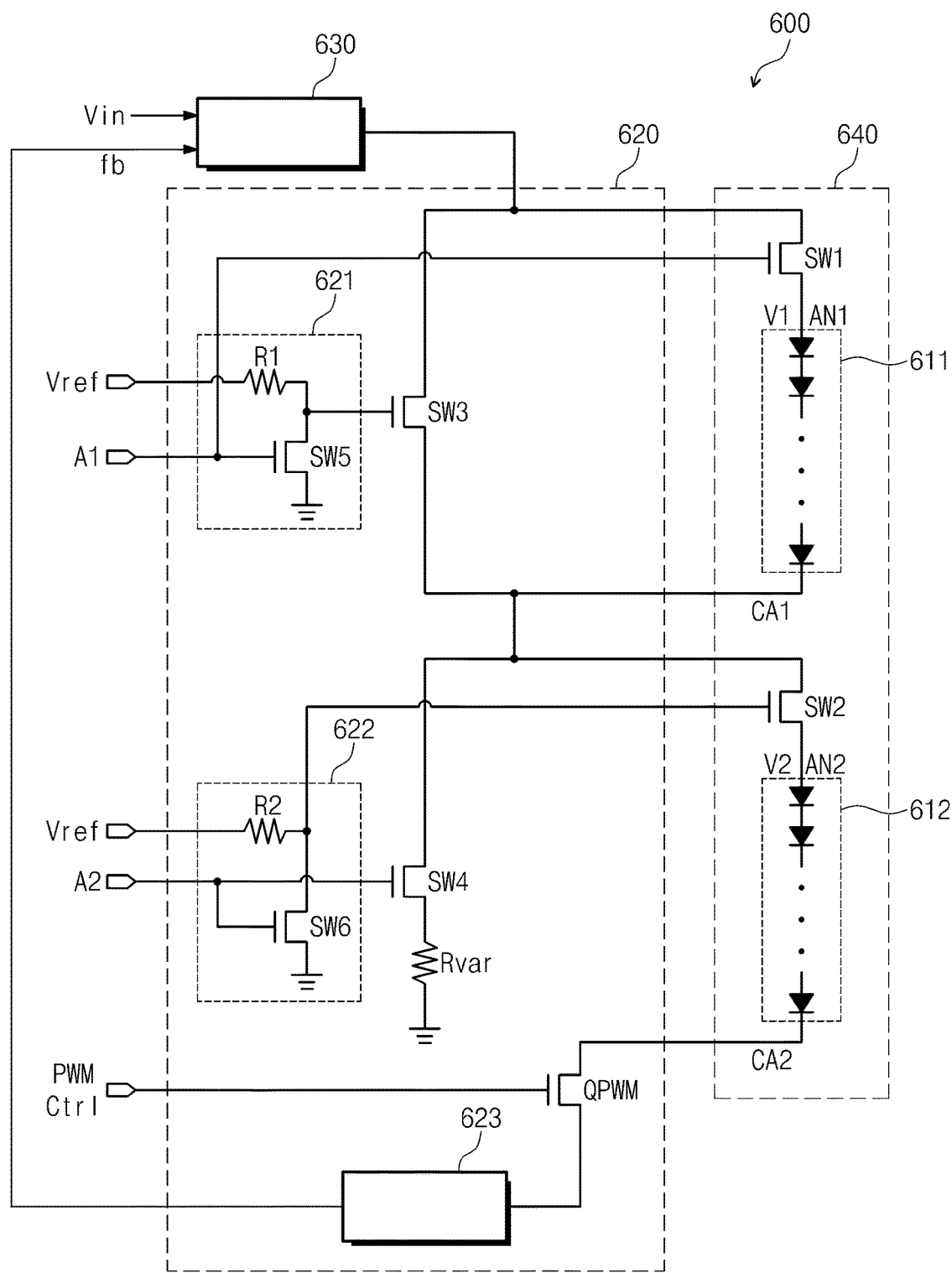
FIG. 10 is a diagram illustrating another embodiment of a driving circuit of the backlight unit of FIG. 9 according to the invention.

Referring to FIG. 9, the backlight unit 600 includes a sub LED array 611, a main LED array 612, a first switch SW1, a second switch SW2, an LED driver 620, a DC/DC converter unit 630, and an LED substrate 640. The LED driver 620 does not include the first and second switches SW1 and SW2, unlike that illustrated in FIG. 4.

The sub LED array 611, the main LED array 612, the first switch SW1, and the second switch SW2 may be disposed (e.g., mounted) on the LED substrate 640. In an exemplary embodiment, the LED substrate 640 may be a PCB, for example. In an exemplary embodiment, the LED driver 620 may include an IC and may be disposed (e.g., mounted) on the LED substrate 640.

One terminal of the first switch SW1 is connected to the DC/DC converter unit 630 and the LED driver 620. The other terminal of the first switch SW1 is connected to an anode terminal AN1 of the sub LED array 611. When the LED driver 620 provides the sub switch signal A1 to a control terminal of the first switch SW1, the first switch SW1 is operated in a turned-on state and provides the sub driving voltage V1 to the anode terminal AN1 of the sub LED array 611.

One terminal of the second switch SW2 is connected to a cathode terminal CA1 of the sub LED array 611 and the LED driver 620. The other terminal of the second switch SW2 is connected to an anode terminal AN2 of the main LED array 612. When the LED driver 620 provides the driving signal Vref to a control terminal of the second switch SW2, the second switch SW2 is operated in a turned-on state and provides the main driving voltage V2 to the anode terminal AN2 of the main LED array 612.

The DC/DC converter unit 630 receives the input voltage Vin to generate the driving voltage Vout, and provides the generated driving voltage Vout to the LED driver 620 and the first switch SW1. Both the driving voltage Vout and the input voltage Vin may be a DC voltage, but may have different levels. In an exemplary embodiment, the driving voltage Vout may have a higher voltage level than that of the input voltage Vin, for example.

The LED driver 620 receives the sub switch signal A1, the main switch signal A2, the driving signal Vref, and the driving voltage Vout.

The LED driver 620 individually controls the sub LED array 611 and the main LED array 612. The LED driver 620 receives the sub switch signal A1 to control the sub LED array 611 and the first switch SW1, and receives the main switch signal A2 to control the main LED array 612 and the second switch SW2. The LED driver 620 may output both the sub driving voltage V1 and the main driving voltage V2, or may output one of the sub driving voltage V1 and the main driving voltage V2. In an alternative exemplary embodiment, the LED driver 620 may output neither the sub driving voltage V1 nor the main driving voltage V2.

A sub switch control unit 621, a main switch control unit 622 and feedback unit 623 may be similar to the sub switch control unit 521, and the main switch control unit 522 and the feedback unit 523 shown in FIG. 4, and thus a detailed description will be omitted.

Figure 11:
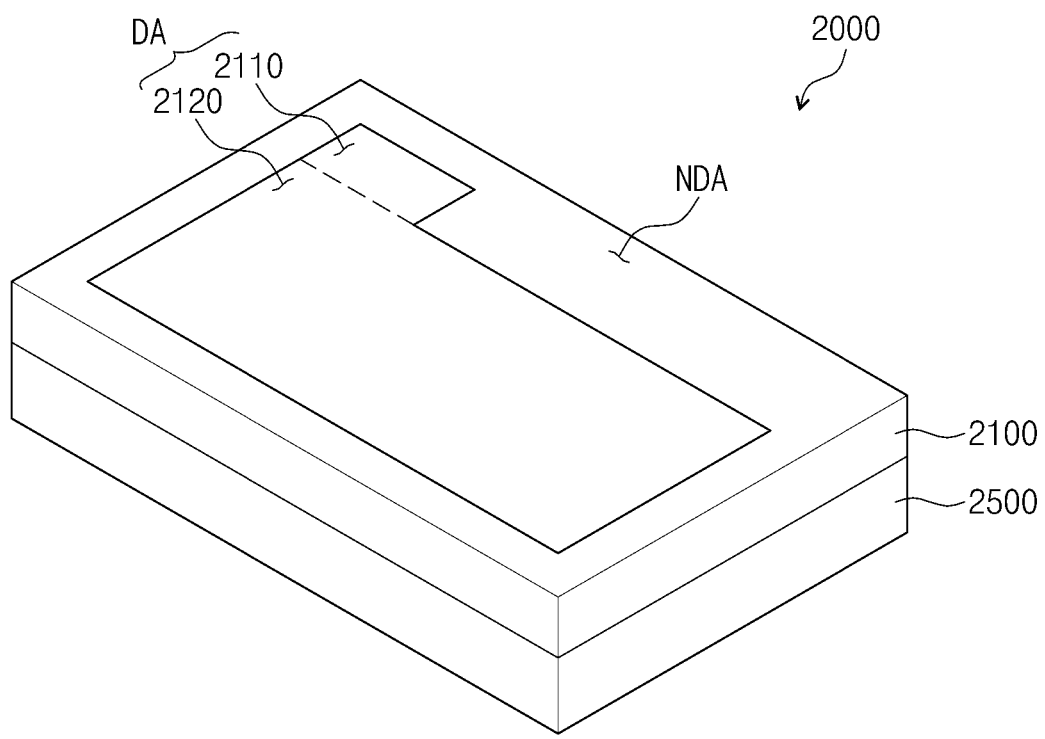
FIG. 11 is a perspective view illustrating an exemplary embodiment of a display apparatus according to the invention.

FIG. 11 is a perspective view illustrating a display apparatus 2000 according to an exemplary embodiment of the invention.

Referring to FIG. 11, the display apparatus 2000 may include a display panel 2100 and a backlight unit 2500. The elements of the backlight unit 2500 are the same as those illustrated in FIG. 2 or 9.

The display panel 2100 may be divided into a display region DA for displaying an image and a non-display region NDA adjacent to the display region DA. The display region DA may be divided into a sub display region 2110 to which light is provided by the sub LED array (similar to the sub LED array 511 or 611 in FIG. 2 or 9) and a main display region 2120 to which light is provided by the main LED array (similar to the sub LED array 512 or 612 in FIG. 2 or 9).

Since the LED driver 2520 individually controls the sub LED array and the main LED array, the sub display region 2110 and the main display region 2120 may individually display images. In detail, the sub switch signal A1 (refer to FIGS. 1 to 10) determines whether to display an image on the sub display region 2110, and the main switch signal A2 (refer to FIGS. 1 to 10) determines whether to display an image on the main display region 2120.

The sub display region 2110 may be disposed at a long side or short side of the main display region 2120. The sub display region 2110 may have a smaller area than that of the main display region 2120. A long side of the sub display region 2110 may be shorter than the long side or short side of the main display region 2120, and may contact the long side or short side of the main display region 2120. Although not illustrated, the sub display region 2110 may be spaced apart from the main display region 2120.

Figure 12:
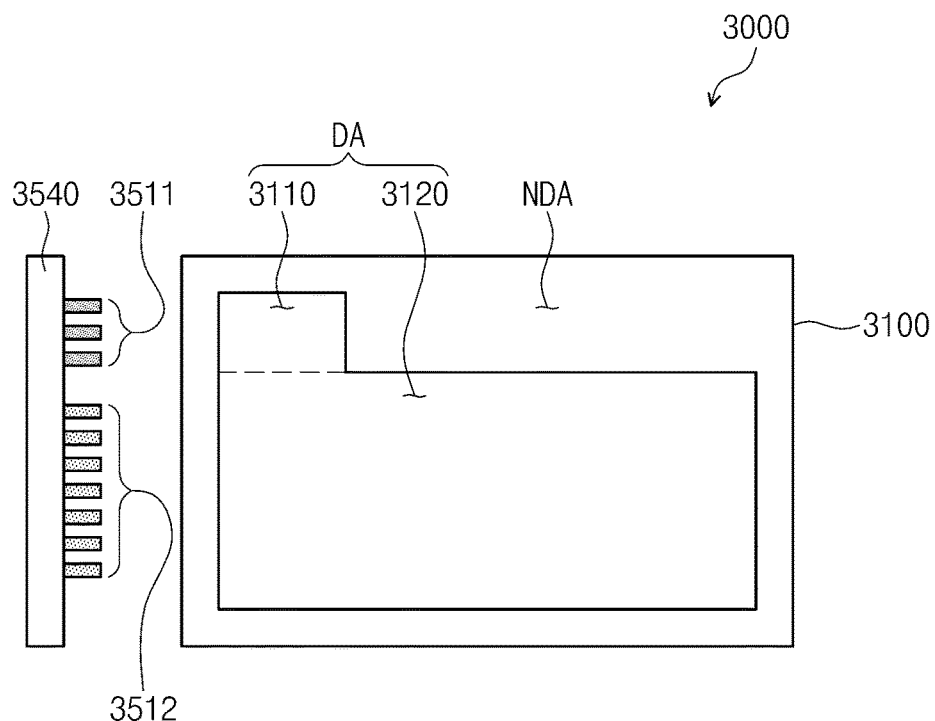
FIG. 12 is a planar view illustrating another exemplary embodiment of a display apparatus according to the invention.

FIG. 12 is a planar diagram illustrating a display apparatus 3000 according to another exemplary embodiment of the invention.

Since a display panel 3100 of FIG. 12 is the same as that of FIG. 11, a detailed description of the display panel 3100 is not provided below.

A sub LED array 3511 and a main LED array 3512 are arranged on an LED substrate 3540. The sub LED array 3511 and the main LED array 3512 may be arranged at a long side or a short side of a backlight unit (similar to the backlight unit 500 in FIG. 1).

In detail, the sub LED array 3511 for providing light to a sub display region 3110 may be disposed at one side of the backlight unit so as to correspond to a long side or short side of the sub display region 3110. The main LED array 3512 for providing light to a main display region 3120 may be disposed at one side of the backlight unit so as to correspond to a long side or a short side of the main display region 3120.

Figure 13:
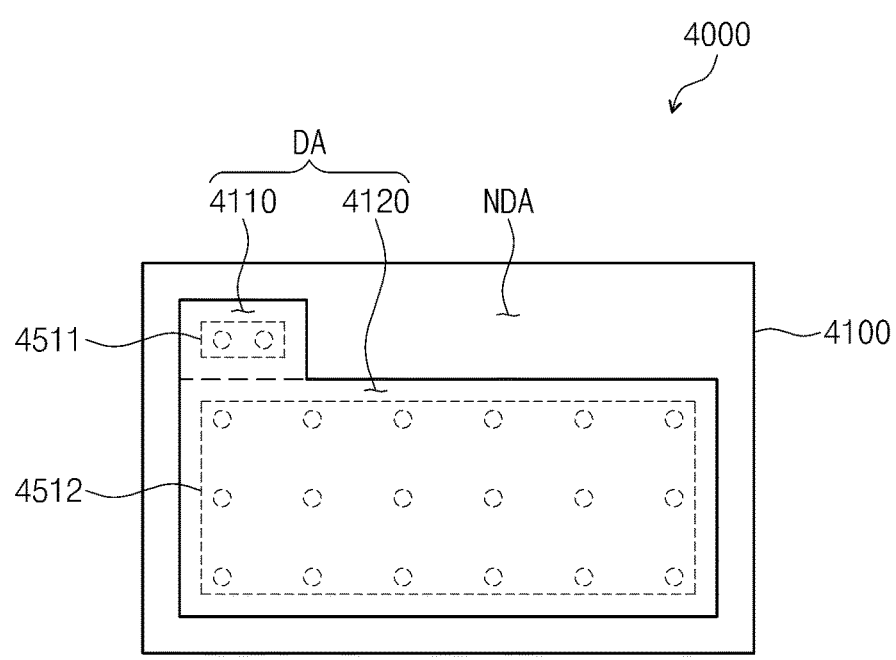
FIG. 13 is a planar view illustrating another exemplary embodiment of a display apparatus according to the invention.

FIG. 13 is a planar diagram illustrating a display apparatus 4000 according to another exemplary embodiment of the invention.

Since a display panel 4100 of FIG. 13 is the same as that of FIG. 11, a detailed description of the display panel 4100 is not provided below.

A backlight unit (similar to the backlight unit 500 in FIG. 1) including a sub LED array 4511 and a main LED array 4512 may be disposed under the display panel 4100.

The sub LED array 4511 for providing light to a sub display region 4110 may be disposed under the sub display region 4110 so as to correspond thereto. The main LED array 4512 for providing light to a main display region 4120 may be disposed under the main display region 4120 so as to correspond thereto.

According to a backlight unit and a display apparatus including the backlight unit according to the exemplary embodiments of the invention, an on-off operation of a main LED array and an on-off operation of a sub LED array may be individually controlled.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A backlight unit comprising:
   a main light-emitting diode array comprising a plurality of light-emitting diodes connected in series;
   a sub light-emitting diode array comprising a plurality of light-emitting diodes connected in series, the sub light-emitting diode array being connected in series to the main light-emitting diode array;
   an light-emitting diode driver which individually controls an on-off operation of the main light-emitting diode array and an on-off operation of the sub light-emitting diode array; and
   a direct current to direct current converter unit which receives an input voltage and provides a direct current voltage to the light-emitting diode driver,
   wherein the light-emitting diode driver comprises:
   a first switch connected in series to the sub light-emitting diode array;
   a second switch connected in series to the main light-emitting diode array;
   a third switch connected in parallel to the sub light-emitting diode array and the first switch connected in series to each other;
   a fourth switch connected in parallel to the main light-emitting diode array and the second switch connected in series to each other;
   a sub switch control unit which controls the first and third switches so that one of the first and third switches is turned on and the other of the first and third switches is turned off; and
   a main switch control unit which controls the second and fourth switches so that one of the second and fourth switches is turned on and the other of the second and fourth switches is turned off.

2. The backlight unit of claim 1, wherein a number of the plurality of light-emitting diodes included in the main light-emitting diode array is larger than that of the plurality of light-emitting diodes included in the sub light-emitting diode array.

3. The backlight unit of claim 1, wherein the sub switch control unit receives a sub switch signal and a driving signal and provides the sub switch signal to the first switch to turn on the first switch or provides the driving signal to the third switch to turn on the third switch.

4. The backlight unit of claim 1, wherein the main switch control unit receives a main switch signal and a driving signal and provides the main switch signal to the fourth switch to turn on the fourth switch or provides the driving signal to the second switch to turn on the second switch.

5. The backlight unit of claim 3,
   wherein the third switch is a transistor, and
   wherein the sub switch control unit comprises:
   a fifth switch which receives the sub switch signal; and
   a first resistor, one terminal of which receives the driving signal and the other terminal of which is connected to one terminal of the fifth switch and a control terminal of the third switch.

6. The backlight unit of claim 4,
   wherein the second switch is a transistor, and
   wherein the main switch control unit comprises:
   a sixth switch which receives the main switch signal; and
   a second resistor, one terminal of which receives the driving signal and the other terminal of which is connected to one terminal of the sixth switch and a control terminal of the second switch.

7. The backlight unit of claim 1, wherein the light-emitting diode driver further comprises a transistor connected to a cathode terminal of the main light-emitting diode array and adjusting a luminance of the main light-emitting diode array.

8. The backlight unit of claim 1, wherein the light-emitting diode driver further comprises a variable resistor connected to one terminal of the fourth switch and adjusting a luminance of the sub light-emitting diode array.

9. A backlight unit comprising:
   a main light-emitting diode array comprising a plurality of light-emitting diodes connected in series;
   a sub light-emitting diode array comprising a plurality of light-emitting diodes connected in series, the sub light-emitting diode array being connected in series to the main light-emitting diode array;
   a first switch connected to an anode terminal of the sub light-emitting diode array;
   a second switch connected to an anode terminal of the main light-emitting diode array;
   an light-emitting diode substrate on which the main light-emitting diode array, the sub light-emitting diode array, the first switch, and the second switch are disposed;
   an light-emitting diode driver which individually controls an on-off operation of the main light-emitting diode array and an on-off operation of the sub light-emitting diode array; and
   a direct current to direct current converter unit which receives an input voltage and provides a direct current voltage to the light-emitting diode driver and the first switch,
   wherein the light-emitting diode driver comprises:
   a third switch connected in parallel to the sub light-emitting diode array and the first switch connected in series to each other;
   a fourth switch connected in parallel to the main light-emitting diode array and the second switch connected in series to each other;
   a sub switch control unit which controls the first and third switches so that one of the first and third switches is turned on and the other of the first and third switches is turned off; and
   a main switch control unit which controls the second and fourth switches so that one of the second and fourth switches is turned on and the other of the second and fourth switches is turned off.

10. The backlight unit of claim 9, wherein the sub switch control unit receives a sub switch signal and a driving signal and provides the sub switch signal to the first switch to turn on the first switch or provides the driving signal to the third switch to turn on the third switch.

11. The backlight unit of claim 9, wherein the main switch control unit receives a main switch signal and a driving signal and provides the main switch signal to the fourth switch to turn on the fourth switch or provides the driving signal to the second switch to turn on the second switch.

12. The backlight unit of claim 9, wherein the light-emitting diode substrate is a printed circuit board.

13. A display apparatus comprising:

a display panel which displays an image;

a backlight unit which provides light to the display panel, the backlight unit comprising:

a main light-emitting diode array comprising a plurality of light-emitting diodes connected in series;

a sub light-emitting diode array comprising a plurality of light-emitting diodes connected in series, the sub light-emitting diode array being connected in series to the main light-emitting diode array;

an light-emitting diode driver which individually controls an on-off operation of the main light-emitting diode array and an on-off operation of the sub light-emitting diode array; and a direct current to direct current converter unit which receives an input voltage and provide a direct current voltage to the light-emitting diode driver, wherein the light-emitting diode driver comprises:

a third switch connected in parallel to the sub light-emitting diode array and the first switch connected in series to each other;

a fourth switch connected in parallel to the main light-emitting diode array and the second switch connected in series to each other;

a sub switch control unit which controls the first and third switches so that one of the first and third switches is turned on and the other of the first and third switches is turned off; and a main switch control unit which controls the second and fourth switches so that one of the second and fourth switches is turned on and the other of the second and fourth switches is turned off.

14. The display apparatus of claim 13, wherein the display panel is divided into a display region which displays the image and a non-display region adjacent to the display region, wherein the display region is divided into a sub display region to which light is provided by the sub light-emitting diode array and a main display region to which light is provided by the main light-emitting diode array.

15. The display apparatus of claim 14, wherein the sub display region is disposed at a long side or a short side of the main display region.

16. The display apparatus of claim 14, wherein the sub display region has an area smaller than that of the main display region.

17. The display apparatus of claim 13, wherein the sub light-emitting diode array and the main light-emitting diode array are arranged under the display panel.

18. The display apparatus of claim 13, wherein the sub light-emitting diode array and the main light-emitting diode array are arranged at a long side or a short side of the backlight unit.

* * * * *